No. 875,275.
PATENTED DEC. 31, 1907.
G. E. LEWIS.
ATTACHMENT FOR BEAN HARVESTERS.
APPLICATION FILED MAR. 27, 1907.
2 SHEETS—SHEET 1.
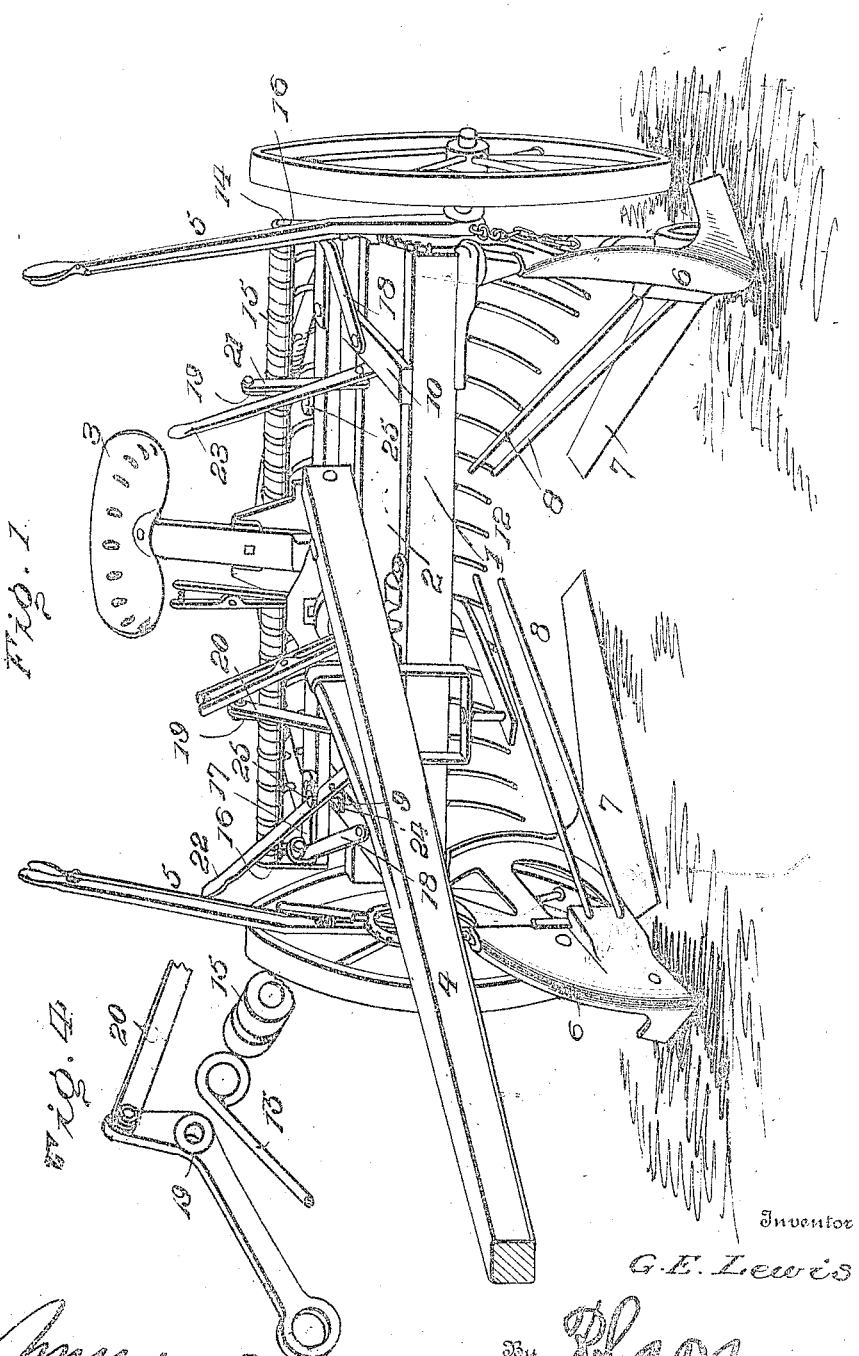
Witnesses
Inventor
G. E. Lewis
By
Attorneys No. 875,275.　　　　　　　　　　　　　PATENTED DEC. 31, 1907.
G. E. LEWIS.
ATTACHMENT FOR BEAN HARVESTERS.
APPLICATION FILED MAR. 27, 1907.
2 SHEETS—SHEET 2.
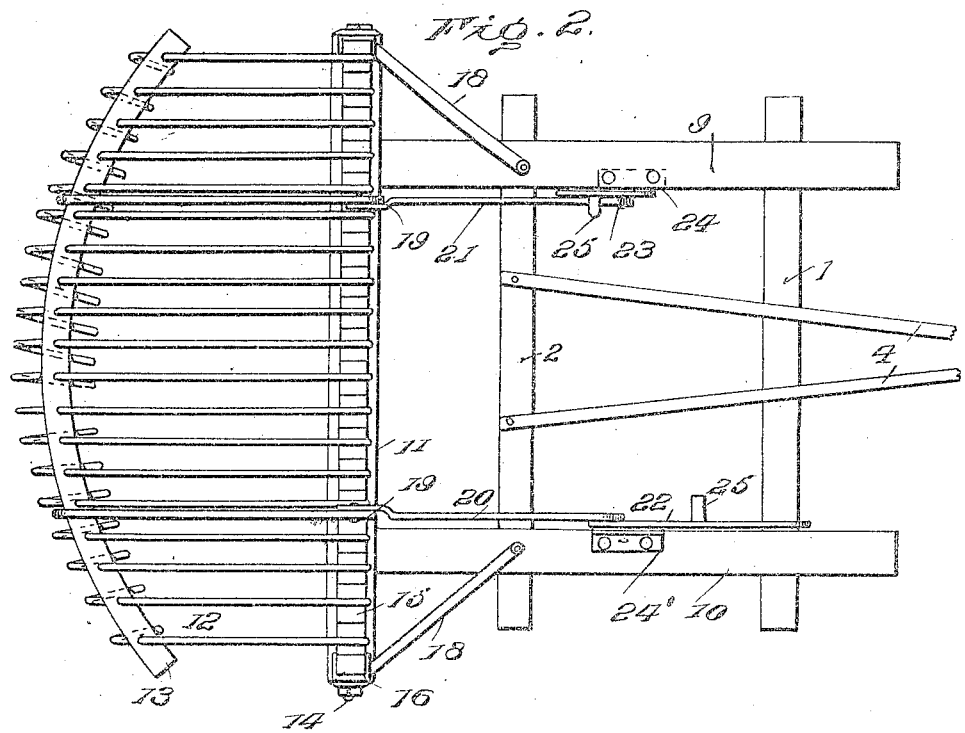
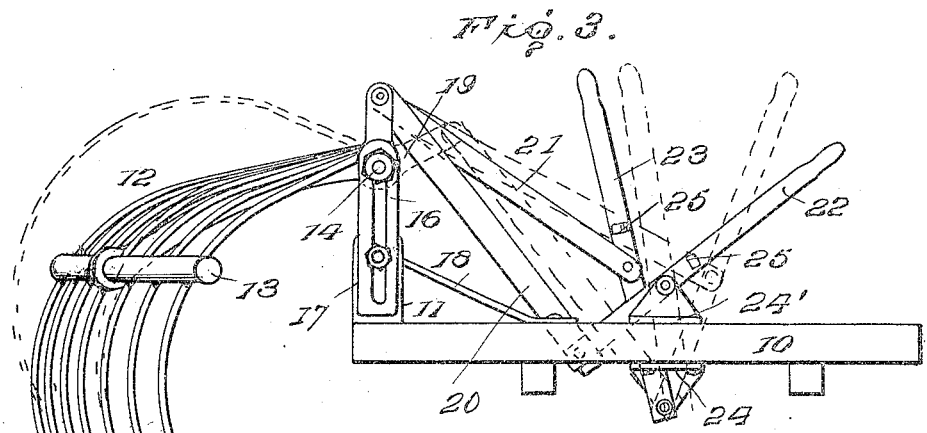
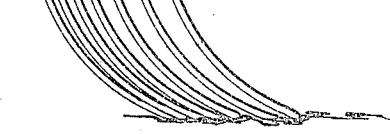
Witnesses
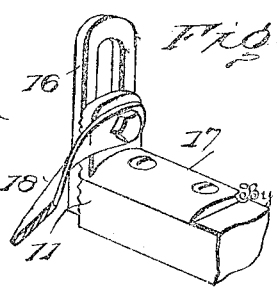
Inventor
G. E. Lewis
Attorneys

UNITED STATES PATENT OFFICE.

GERSHAM E. LEWIS, OF DEWEY, OKLAHOMA, ASSIGNOR OF ONE-HALF TO W. H. HESS, OF DEWEY, OKLAHOMA.

ATTACHMENT FOR BEAN-HARVESTERS.

No. 875,275.

Specification of Letters Patent.

Patented Dec. 31, 1907.

Application filed March 27, 1907. Serial No. 364,937.

*To all whom it may concern:*

Be it known that I, GERSHAM E. LEWIS, citizen of the United States, residing at Dewey, Cherokee Nation, Oklahoma, have invented certain new and useful Improvements in Attachments for Bean-Harvesters, of which the following is a specification.

In the operation of gathering beans with the use of a harvesting machine, the harvester, as it travels along, cuts the roots of the beans and pushes them into a row between the two blades or shares. The beans are thus left more or less in the dirt and attendants follow the harvesting machine, with forks in hand and pitch the beans out of the dirt and throw them into piles to dry. When dry they are thrown on a wagon and hauled away.

This invention has for its object an improved attachment for bean harvesters, which will pick the beans up out of the dirt, as soon as they are harvested and pile them ready to dry and pitch into the wagon or other receptacle.

The invention consists in a simple, durable, and efficient construction of attachment of this character, and also in the details of construction and arrangement of parts thereof, which I shall hereinafter fully describe and then point out the novel features in the appended claim.

For a full understanding of the invention and the merits thereof and also to acquire a knowledge of the details of construction of the means for effecting the result, reference is to be had to the following description and accompanying drawings, in which:

Figure 1 is a perspective view of a bean harvester equipped with the improvements of my invention; Fig. 2 is a plan view of the attachment; Fig. 3 is a side elevation thereof; Fig. 4 is a detail perspective view of one of the bell cranks employed, the end of one of the forks and a bushing around which the fork is adapted to fit; and, Fig. 5 is a detail perspective view of one of the bearings.

Corresponding and like parts are referred to in the following description and indicated in all the views of the drawings by the same reference characters.

Referring to the drawings, which show, for the purpose of illustration only, a standard type of bean harvesting machine, 1 and 2 designate the main transverse beams of the framework, 3 the driver's seat, 4 the pole extending forwardly therefrom, the rear end of which is split or spread as best seen in Fig. 2, 5 the side levers for adjusting the knives or shares, 6 the guards, 7 the knives or shares which converge rearwardly from the guards, and 8 the cleaners which consist of steel rods attached to the guards.

My improved gathering attachment embodies two longitudinally extending sills 9 and 10 that are clipped, bolted, or otherwise secured to the beams 1 and 2 of the harvester framework and also embodies a transverse sill 11 at the rear ends of the sills 9 and 10.

The forks or teeth 12 that are designed to gather the beans as they are laid in rows between the shares 7 are arranged in transverse series as shown, and are bowed longitudinally, the series itself being bowed transversely somewhat to produce what may be termed a basket structure. The teeth 12 are preferably composed of spring steel and are secured between their upper and lower ends to a bowed rod 13 and are also secured at their upper ends in a pivotal manner, preferably by being curled around a transversely extending shaft 14, as shown, the said teeth being spaced from each other at their pivoted ends by means of a series of grooved spools 15, slipped over said shaft. The shaft 14 is journaled at its ends in strap brackets 16 that are slotted as shown for vertical adjustment and are adapted for locking engagement at different elevations with the vertically disposed members of angular brackets 17 secured to the ends of the transverse sill 11. The opposing faces of the strap brackets 16 and the members of the angular brackets 17 with which they engage are preferably serrated or roughened, to insure a rigid connection after the bolts which extend through the brackets 17 into the slots 16 have been tightened.

18 designates braces connecting the sills 9 and 10 with the respective brackets 17.

In their lower operative position, the series of gathering teeth 12 are located just back of the shares or blades 7, and in order to raise and lower the teeth, I preferably provide two bell cranks 19 that are mounted at their elbows on the shaft 14 and are secured at one end to the rod 13. The other arms of said bell cranks are connected, respectively, to the links 20, 21, that are in turn connected to the levers 22, 23, fulcrumed on brackets or castings 24 and 24', attached to the longitudinal sills 9 and 10. Each of these levers is provided with a foot portion 25. In the preferred arrangement, the levers are designed to operate in opposite directions, that is, one lever is fulcrumed at its end and has its link connected thereto above the fulcrum, while the other lever is fulcrumed intermediate of its ends and has its link connected thereto below the fulcrum. Both levers are arranged in proper relation to the driver's seat 3.

From the foregoing description in connection with the accompanying drawings, it will be seen that in the practical operation, as the bean harvester travels over the fields and cuts the beans and lays them in rows, the teeth 12 in lowered position just back of the shares will gather up the beans from the dirt as soon as the beans have been cut, and that as soon as the teeth shall have been filled, the driver may, by manipulating the levers, raise the basket-like series of teeth and dump the load into a pile, where the beans may be left to dry and then pitched into a wagon, or other receptacle designed to receive them.

Having thus described the invention, what is claimed as new is:

A bean harvester embodying a traveling framework, bean cutting shares carried thereby, a transverse shaft mounted on said framework, a series of grooved spools on said shaft, a series of longitudinally bowed teeth suspended from said shaft and spaced by said spools, a bowed rod connecting together said series of teeth at points intermediate of their ends, bell cranks fulcrumed on said shaft, one arm of each of said bell cranks being connected to said rod, and levers fulcrumed on the framework and operatively connected to the other arms of said bell cranks.

In testimony whereof I affix my signature in presence of two witnesses.

GERSHAM E. LEWIS. [L. S.]

Witnesses:
WILLIAM R. HAMILTON,
H. J. SMITH.